(12) United States Patent
Singer et al.

(10) Patent No.: US 7,080,799 B2
(45) Date of Patent: Jul. 25, 2006

(54) PYROTECHNIC DRIVE

(75) Inventors: Markus Singer, Reichenbach a. d. Fils (DE); Wolf-Dieter Hoenl, Boebingen (DE); Thomas Moedinger, Alfdorf (DE); Patrick Foussier, Goeggingen (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 10/810,942

(22) Filed: Mar. 26, 2004

(65) Prior Publication Data

US 2004/0195421 A1    Oct. 7, 2004

(30) Foreign Application Priority Data

Mar. 28, 2003 (DE) ............ 203 05 088 U
Sep. 18, 2003 (DE) .............. 103 43 195

(51) Int. Cl.
*B65H 75/48* (2006.01)
(52) U.S. Cl. ............ 242/374; 74/411; 280/807; 297/478
(58) Field of Classification Search ........... 242/374; 280/807; 297/478
See application file for complete search history.

(56) References Cited

U.S. PATENT DOCUMENTS

| | | | | |
|---|---|---|---|---|
| 5,022,279 A | * | 6/1991 | Ueno et al. | ........... 74/422 |
| 6,149,095 A | | 11/2000 | Specht et al. | |
| 6,241,173 B1 | * | 6/2001 | Wier | ........... 242/382 |
| 6,318,662 B1 | | 11/2001 | Hori et al. | |
| 6,591,706 B1 | * | 7/2003 | Harer et al. | ........... 74/422 |

FOREIGN PATENT DOCUMENTS

| | | |
|---|---|---|
| DE | 19846227 | 4/2000 |
| EP | 0940603 | 9/1999 |
| JP | 9002207 | 1/1997 |
| JP | 2000302011 | 10/2000 |
| JP | 2000313311 | 11/2000 |
| JP | 2001233176 | 8/2001 |

* cited by examiner

*Primary Examiner*—Kathy Matecki
*Assistant Examiner*—Sang Kim
(74) *Attorney, Agent, or Firm*—Tarolli, Sundheim, Covell & Tummino LLP (57) ABSTRACT

A linear drive has a cylinder, a piston guided displaceably in said cylinder, and a pinion. The piston is provided with teeth which can engage into the pinion in order to rotate the pinion upon displacement of the piston. The drive further has at least one deformable element which prevents blocking when the teeth enter into engagement with the pinion.

12 Claims, 11 Drawing Sheets

PYROTECHNIC DRIVE

The invention relates to a pyrotechnic drive. The invention further relates to a belt retractor using a pyrotechnic drive.

BACKGROUND OF THE INVENTION

A pyrotechnic drive comprises a cylinder and a piston displaceably guided therein. A pinion can be provided, and the piston is provided with teeth which can engage into the pinion, in order to set it in rotation with a displacement of the piston.

The above-mentioned drive is used for example in a belt retractor where the main concern is to set a belt spool in rotation within the shortest space of time, in order to eliminate a belt slack. So as not to impair the other function of the unit which is to be driven, i.e. for example of the belt retractor, it is advantageous that the drive shaft can rotate freely, as long as the drive is not yet triggered. This is ensured in that the piston is not yet in engagement with the pinion by its teeth in the initial state. However, it must be ensured that with the run-in of the teeth into the pinion, the first tooth of the piston teeth hits into a tooth gap of the pinion.

German Patent Application DE 198 46 227 shows a generic drive in which to solve the said problem the first tooth of the piston teeth is constructed as a half-tooth with a shortened tooth head.

The invention provides a further pyrotechnic drive, in which a reliable run-in of the piston teeth into the pinion is ensured.

BRIEF DESCRIPTION OF THE INVENTION

The invention provides a pyrotechnic drive which has a cylinder, a piston guided displaceably in said cylinder, and a pinion. The piston is provided with teeth which can engage into the pinion in order to rotate the pinion upon displacement of the piston. The drive further has at least one deformable element which prevents blocking when the teeth enter into engagement with the pinion. If in the beginning of engagement of the piston with the pinion, hereinafter referred to as "run-in of the piston", the pinion is in such an unfavourable position that the first tooth of the piston teeth strikes onto a tooth of the pinion, then a blocking can occur when the contact force from the piston teeth acting on the tooth of the pinion acts at the contact site radially onto the pinion. The deformable element nevertheless permits a further movement of the piston and hence a rotation of the pinion until the two sets of teeth engage into each other correctly.

According to a preferred embodiment, an output element is provided, the deformable element being provided between the output element and the pinion, where it allows a play for the pinion with respect to the output element. Thus, in the case of an unfavourable striking of the teeth of the set of piston teeth and the pinion, the pinion can withdraw owing to the play with respect to the output element, until the pinion is rotated so far that the teeth of the piston and of the pinion engage into each other.

According to a second aspect, the invention provides a belt retractor with a belt spool and with a belt tensioner which has such a pyrotechnic drive. The secure run-in of the teeth of the pinion ensures a reliable operation of the belt tensioner without impairing the remaining functions of the belt retractor.

Further advantageous embodiments will be apparent from the dependent claims.

BRIEF DESCRIPTION OF THE DRAWINGS

The invention is described in detail below with the aid of preferred embodiments. Here, reference is made to the enclosed drawings, in which.

DETAILED DESCRIPTION OF THE INVENTION

Figure 1:
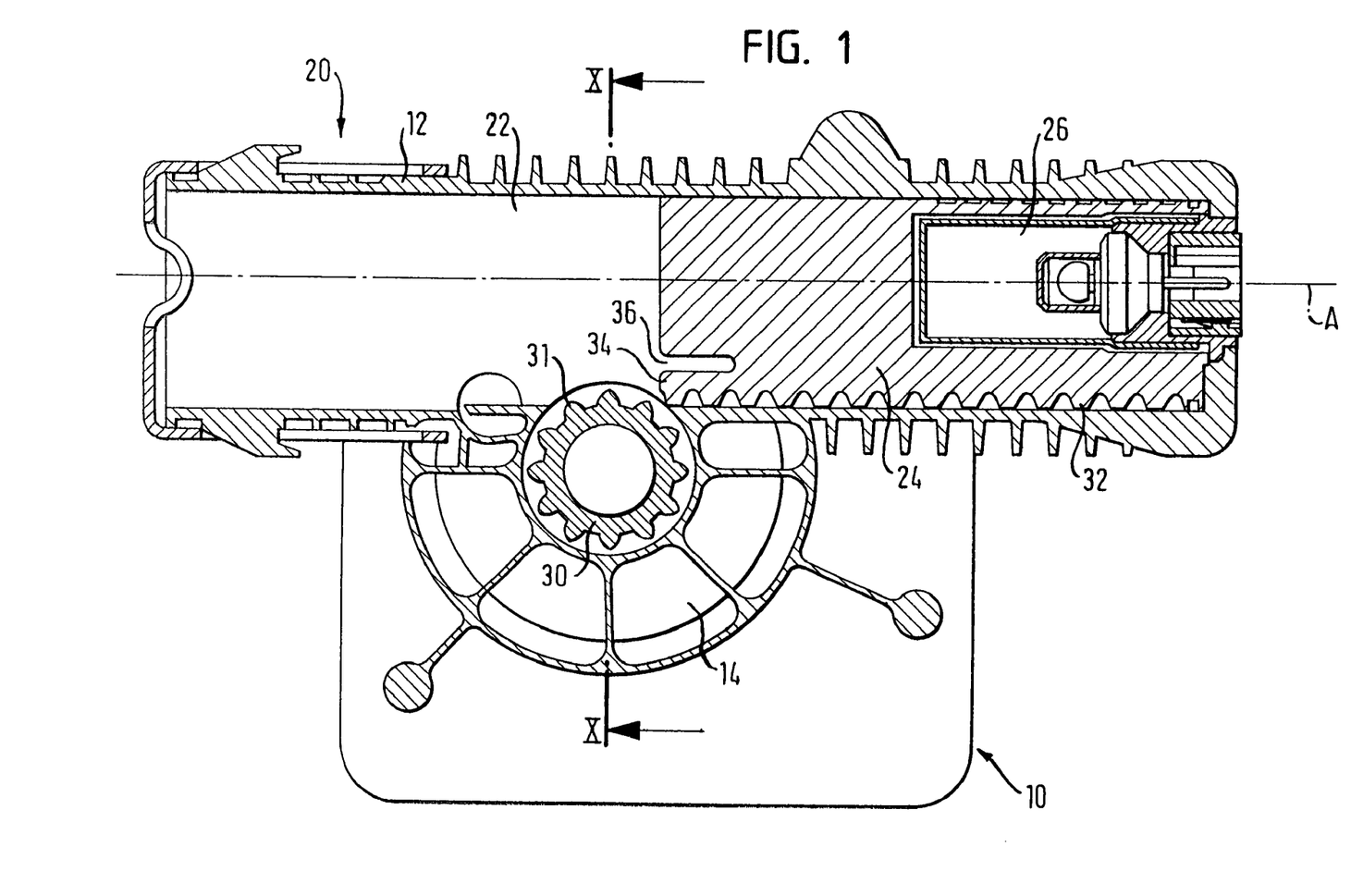
FIG. 1 shows a diagrammatic cross-section through a belt retractor according to a first embodiment of the invention.

The belt retractor 10 illustrated in FIG. 1 is equipped with a rotatably mounted belt spool 14 and with a belt tensioner, which has a drive 20 with a cylinder 22 and with a piston 24 displaceably guided therein. The cylinder 22 is constructed in a housing 12 of the drive 20 and contains a charge 26 for the generation of compressed gas, with which the piston 24 can be driven. The drive 20 acts on the belt spool 14, on which a pinion 30 with teeth 31 is formed, which projects into the cylinder 22. The piston 24 is provided with teeth 32 parallel to its longitudinal axis A, which can engage into the pinion 30 when the piston 24 is displaced. In this way, the belt spool 14 can be driven, in order to roll the belt band and thereby eliminate a belt slack.

Figure 10:
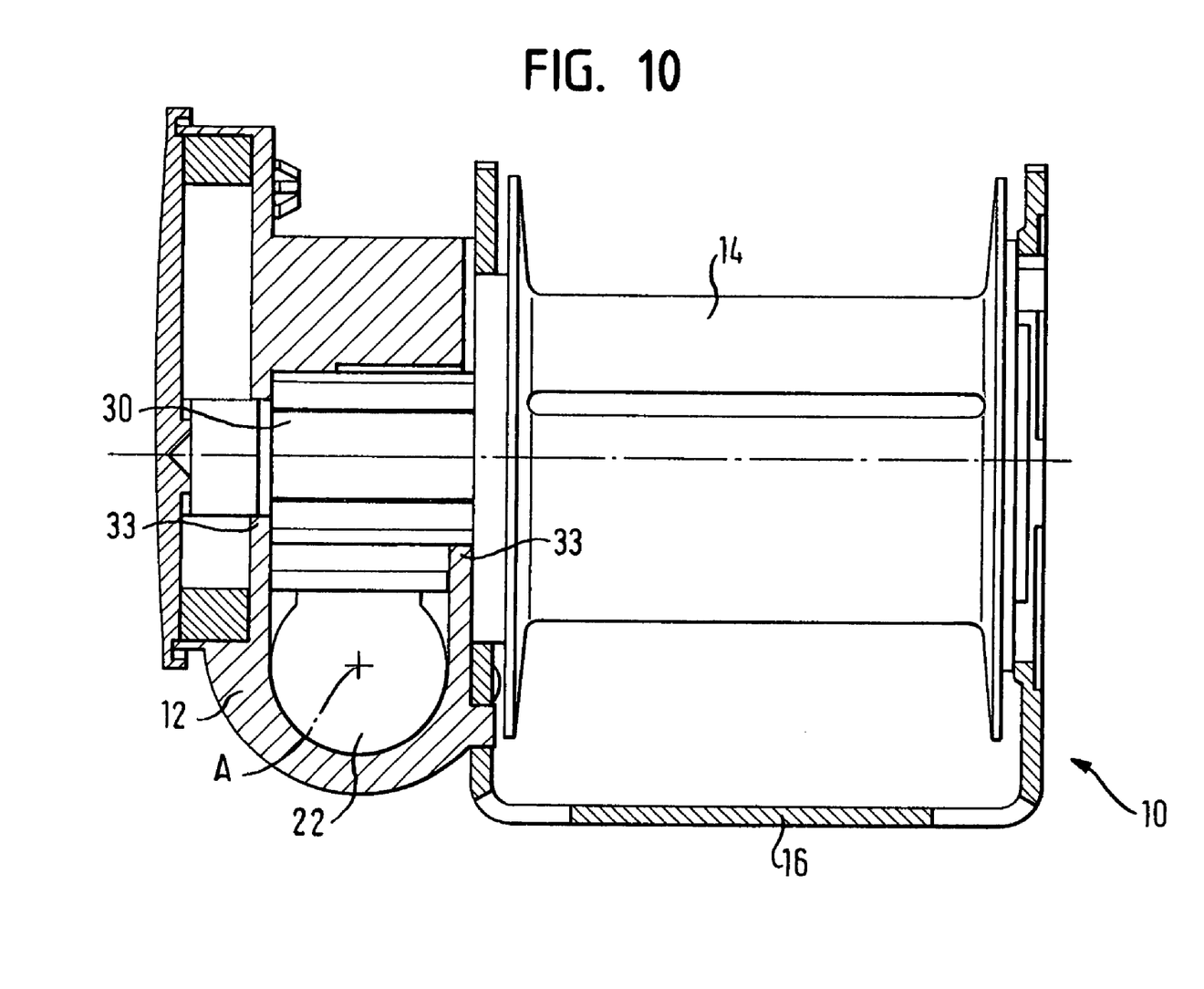
FIG. 10 shows a longitudinal section through the belt spool of FIG. 1 along the line X—X in FIG. 1.

In the longitudinal section of the belt retractor 10 in FIG. 10, it can be seen that the pinion 30 is supported on both sides in the housing 12 by bearing sites 33. Thereby, the housing 12 can receive a transverse moment occurring with the driving of the pinion 30 by the piston 24, whereby it is avoided that the pinion 30 travels out from the longitudinal axis A. Advantageously, both the cylinder 22 and also the housing 12 can be produced at a favourable cost in one piece, for example from die cast metal. In FIG. 1 the piston 24 is illustrated in its initial position, in which the teeth 32 are still situated outside the engagement of the pinion 30, so that the belt spool 14 can freely rotate. The first teeth of the set of teeth 32 at the front end of the piston 24 form a run-in section 34 which is constructed as a deformable element. For this purpose, at the front end of the piston 24, above the teeth 32 in the figure, a slit 36 is provided which extends parallel to the teeth 32. Thereby, the run-in section 34 can be deformed in a plastic manner when with the run-in of the teeth 32 into the pinion 30 accidentally tooth strikes onto tooth. In this case, the run-in section 34 in FIG. 1 is bent upwards. Thereby, firstly, kinetic energy is decreased, secondly the pinion 30 is set in rotation so that the next tooth 31 of the pinion 30 can come into engagement with the teeth 32. In this way, a blocking of the piston 24 is reliably prevented.

Figure 2:
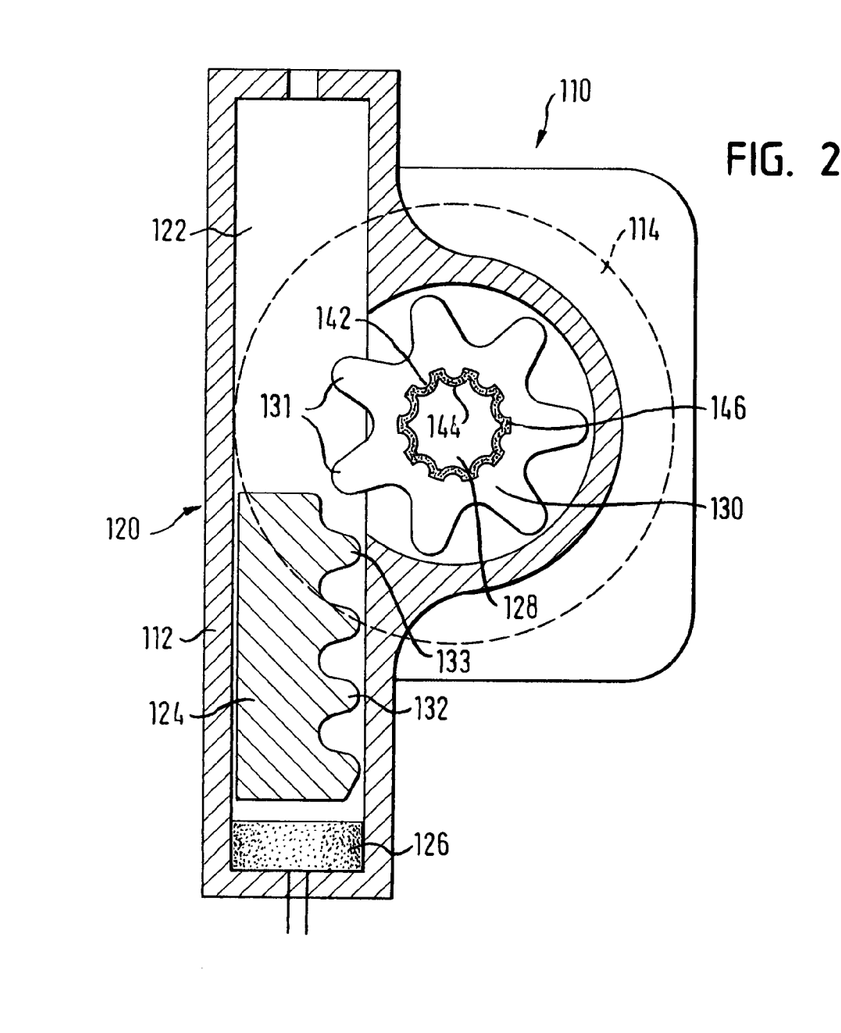
FIG. 2 shows a diagrammatic cross-section through a belt retractor according to a second embodiment of the invention.
Figure 3:
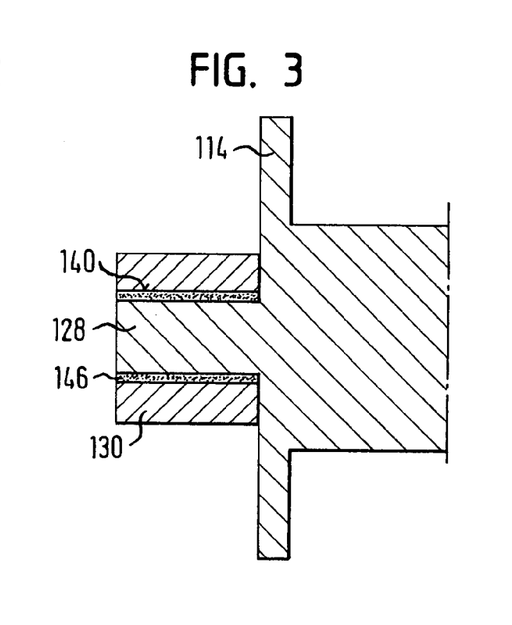
FIG. 3 shows a longitudinal section through belt spool and pinion of the belt retractor of FIG. 2.

In FIGS. 2 and 3 a belt retractor can be seen in accordance with a second embodiment, reference numbers increased by 100 being used in its description for components which are already known.

In this embodiment, the belt spool 114 is provided with an undulating extension 128, on which a pinion 130 sits, into which the teeth 132 of the piston 124 can engage. The pinion 130 has a bore 140 with inner teeth 142, into which outer teeth 144 formed on the undulating extension 128 engage. In a gap space between the inner teeth 142 and the outer teeth 144, a deformable element is situated in the form of an elastic body 146. In the described embodiment, the elastic body 146 consists of a soft material, for example plastic. Alternatively, however, a different plastically and/or elastically deformable body, for instance of aluminium, can be used as deformable element. The filling of the gap space with an elastic grouting material is particularly simple.

In the initial position, the teeth 132 of the piston 124, as illustrated in FIG. 2, are situated outside the engagement of the pinion 130, so that the belt spool 114 can rotate unimpeded by the piston 124.

To trigger the belt tensioner, the charge 126 is ignited, whereby the piston 124 moves towards the pinion 130. In so doing, the teeth 132 of the piston 124 come into engagement with the teeth 131 of the pinion 130. If, in so doing, the first tooth 133 of the teeth 132 accidentally strikes onto a tooth 131 of the pinion 130, then the latter can yield sufficiently due to the elastic body 146, in order to allow the first tooth 133 of the piston 124 to pass. The respective tooth of the pinion 130 can then engage into the gap behind the first tooth 133 of the teeth 132 on the piston 124, so that a reliable run-in of the teeth 132 into the pinion 130 is ensured.

The presence of the inner teeth 142 and of the outer teeth 144 is not imperative, however this construction offers the advantage of a good force transmission between pinion 130 and spool 114, the elastic body 146 substantially only having to transfer pressure forces and no shearing forces.

Figure 4:
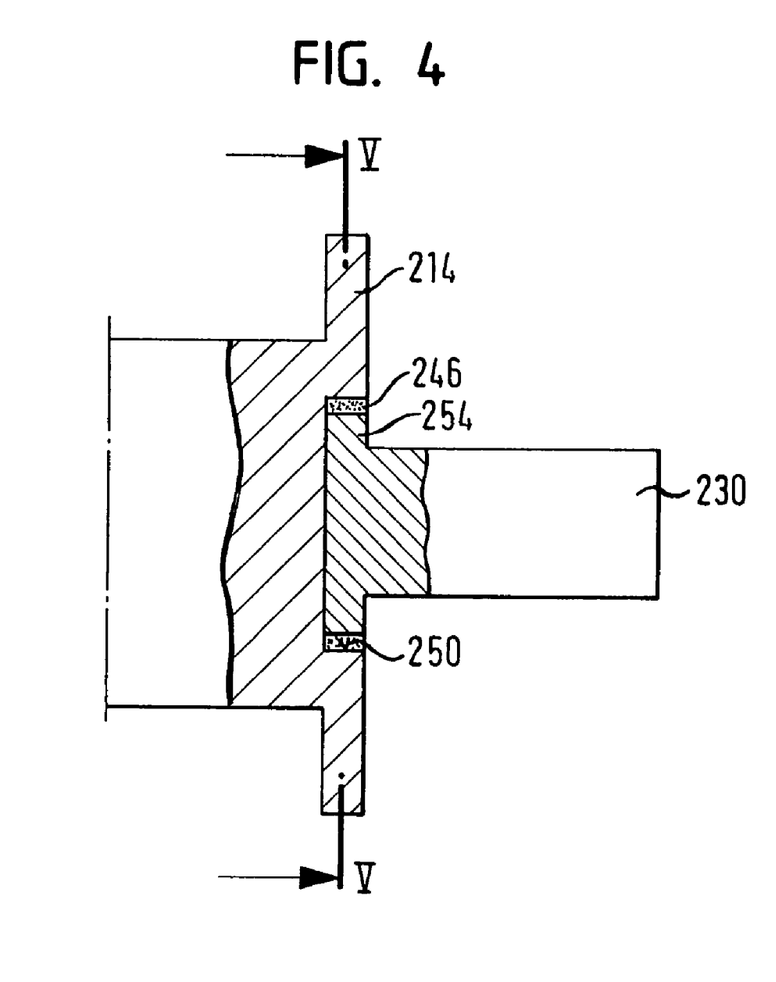
FIG. 4 shows a cross-section through a belt spool with pinion of a belt retractor according to a third embodiment of the invention.
Figure 5:
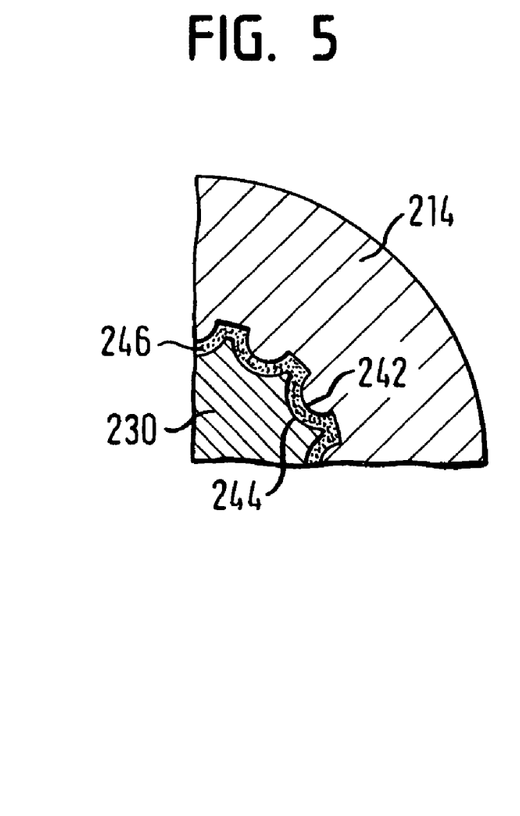
FIG. 5 shows a longitudinal section through the belt spool of FIG. 4 along the line V—V in FIG. 4.

In a third embodiment which is illustrated in FIGS. 4 and 5 and is provided with reference numbers increased by 200, the belt spool 214 is provided with a recess 250 in which inner teeth 242 are constructed. The pinion 230 has at its end face pointing towards the belt spool 214 a flange 254, which is provided with outer teeth 244. These outer teeth 244 engage into the inner teeth 242 of the belt spool 214, an elastic body 246 being situated in turn in the gap space between the inner teeth 242 and the outer teeth 244.

This embodiment has the advantage compared with the first embodiment that with the same pitch circle of the pinion 230, the radius of inner- and outer teeth 242 or respectively 244 is greater, so that a greater moment of rotation can be transferred there, or respectively the stress of the elastic body 246 is less with the same moment of rotation.

Figure 6:
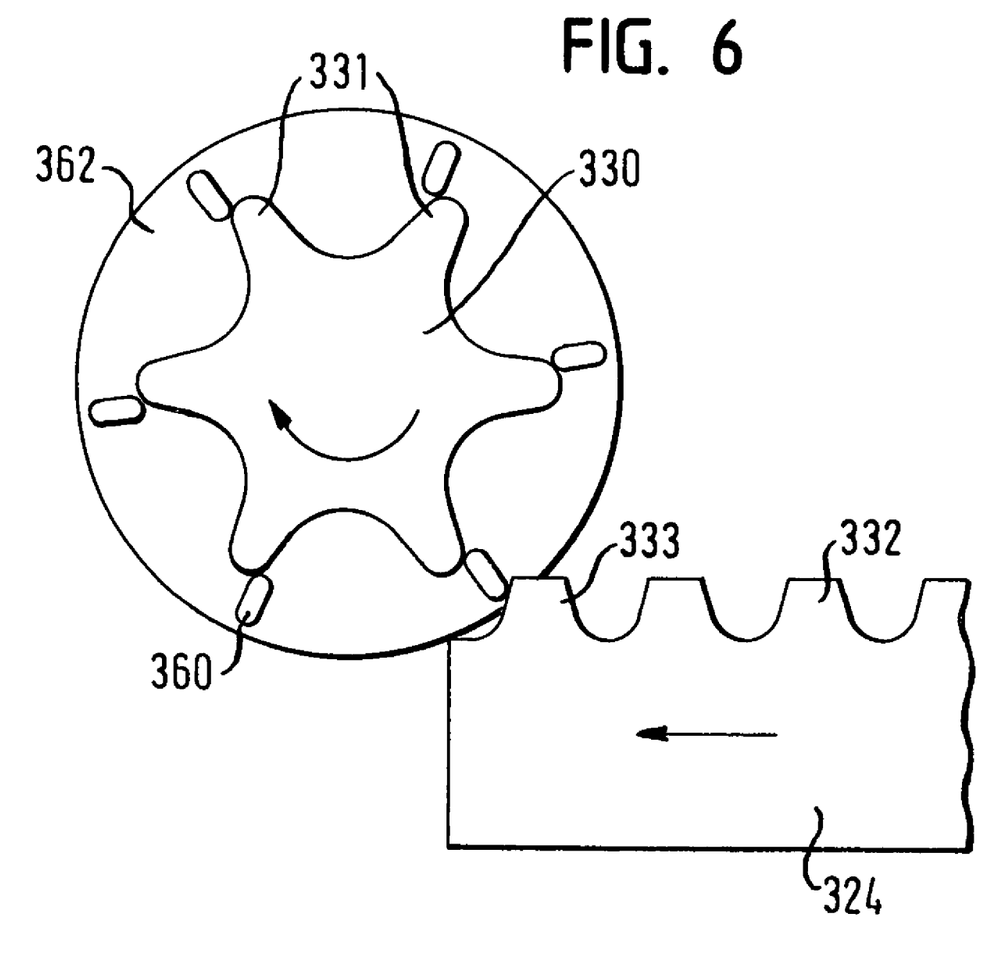
FIG. 6 shows a cross-section through a pinion and piston of a linear drive according to a fourth embodiment of the invention.

In FIG. 6 the pinion 330 and the piston 324 are illustrated for a linear drive according to a fourth embodiment of the invention and provided with reference numbers increased by 300.

In this embodiment, pre-fixing bodies 360 which are arranged in front of the teeth 331 of the pinion 330, form deformable elements between the teeth 332 of the piston 324 and the pinion 330. As can be seen in FIG. 6, the pre-fixing bodies 360 are arranged on a flange 362 of the pinion 330, which projects over the pitch circle of the pinion. The pre-fixing bodies 360 are constructed so as to be deformable, so that they can deform in an elastic and/or plastic manner, when the first tooth 333 of the teeth 332 strikes onto one of the pre-fixing bodies 360 so that it exerts a contact force which acts radially onto the pinion 330.

The flexibility of the pre-fixing bodies 360 prevents a blockade of the piston 324 and allows it to move further, the pinion 330 being set in rotation, as is indicated by the arrow in FIG. 6. The flexibility of the pre-fixing bodies 360 also causes a reduction of kinetic energy to protect the teeth 331 and 333 with the striking of the teeth 332 onto the pinion 330.

Alternatively or additionally, provision can be made that the pre-fixing bodies 360 are sheared off from the flange through the engagement of the teeth 332 into the pinion 330 for the reduction of kinetic energy.

Alternatively, pre-fixing bodies can also be constructed on the sides of the teeth 331 of the pinion 330 or on the first tooth 333 of the teeth 332, for example as a tooth section having increased height.

Figure 7:
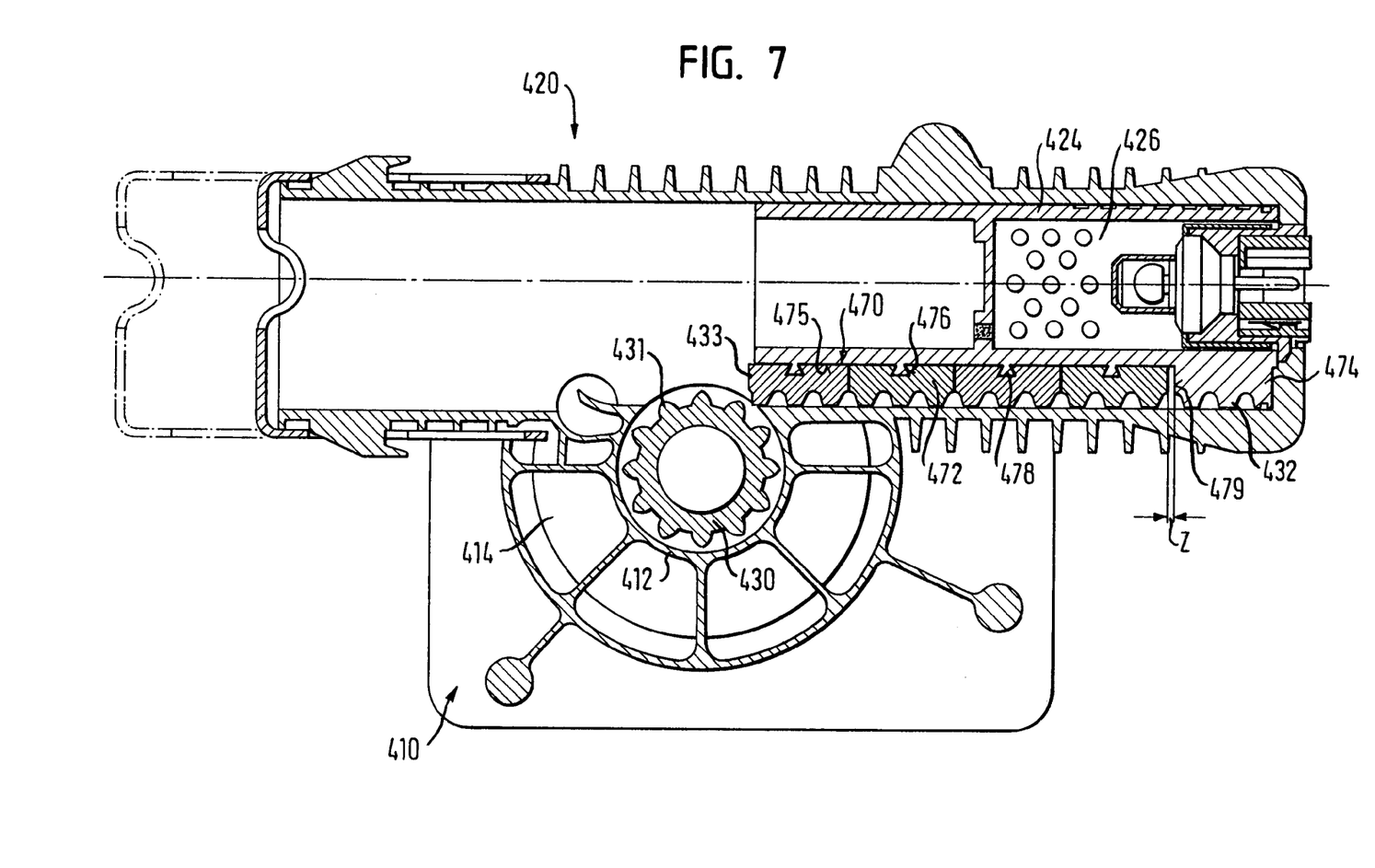
FIG. 7 shows a diagrammatic cross-section through a belt retractor according to a fifth embodiment of the invention.

In FIG. 7 a belt retractor is shown in accordance with a fifth embodiment of the invention, in the description of which, reference numbers increased by 400 are used for components which are already known.

In this embodiment, a recess 470 is provided on the piston 424. In this recess 470, separate segments 472 are housed, which have teeth on their front side which form the front part of the teeth 432. The rear part of the teeth is constructed on a shoulder 474 of the piston. On the rear side of the segments 472, with which they lie against a sliding surface 475 on the piston 424, recesses 476 are provided, into which pins 478, constructed on the piston, engage. The surface of the shoulder 474, perpendicular to the sliding surface 475, which delimits the recess 470, forms a support surface 479, a gap Z being provided between the support surface 479 and the segments 472.

The pins 478 form a deformable element between the piston and the pinion 430, so that in the case of an unfavourable striking onto each other of the first tooth 433 of the teeth 432 and the teeth 431 of the pinion 430, the segments 472 are displaceable by the length Z until the segments 472 lie against the support surface 479. Thereby, the shock on striking of the teeth onto each other is damped and the pinion 430 is set in rotation until the teeth 432 can engage into the pinion 430, without a blockage of the piston 424 occurring.

Figure 8:
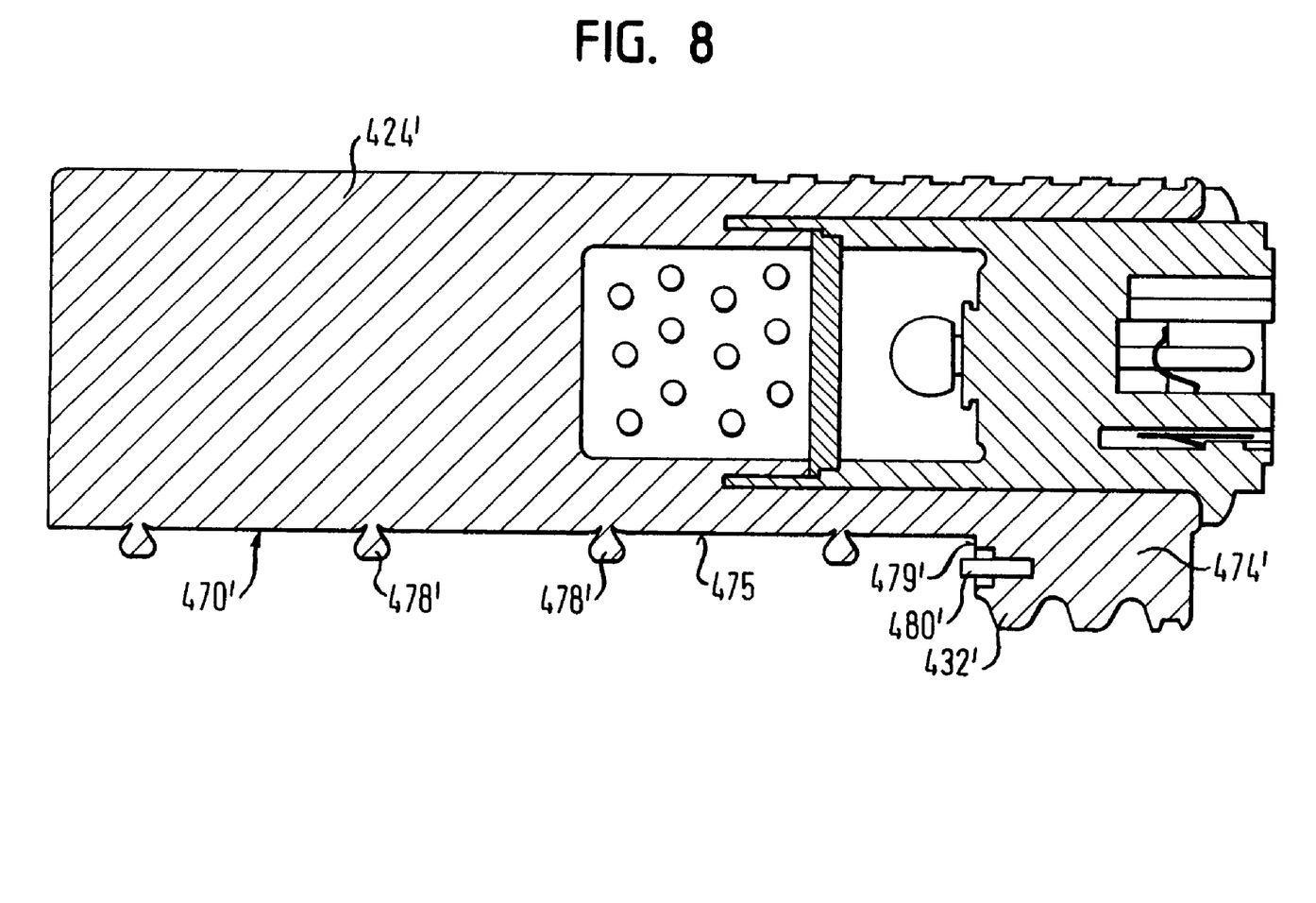
FIG. 8 shows a cross-section through a second type of construction of a piston for the belt retractor of FIG. 7.

In FIG. 8 a variant of a piston 424' can be seen for the drive of FIG. 7. In this piston, the shoulder 474' is equipped with a damping element 480' which forms a second deformable element between piston 424 and pinion. The damping element 480' sits in a bore in the support surface 479' on the shoulder 474'. With a displacement of the segments 472, as was previously described, the damping element 480' can receive energy to protect the teeth 431 and 433, by being elastically upset and/or deformed.

Figure 9:
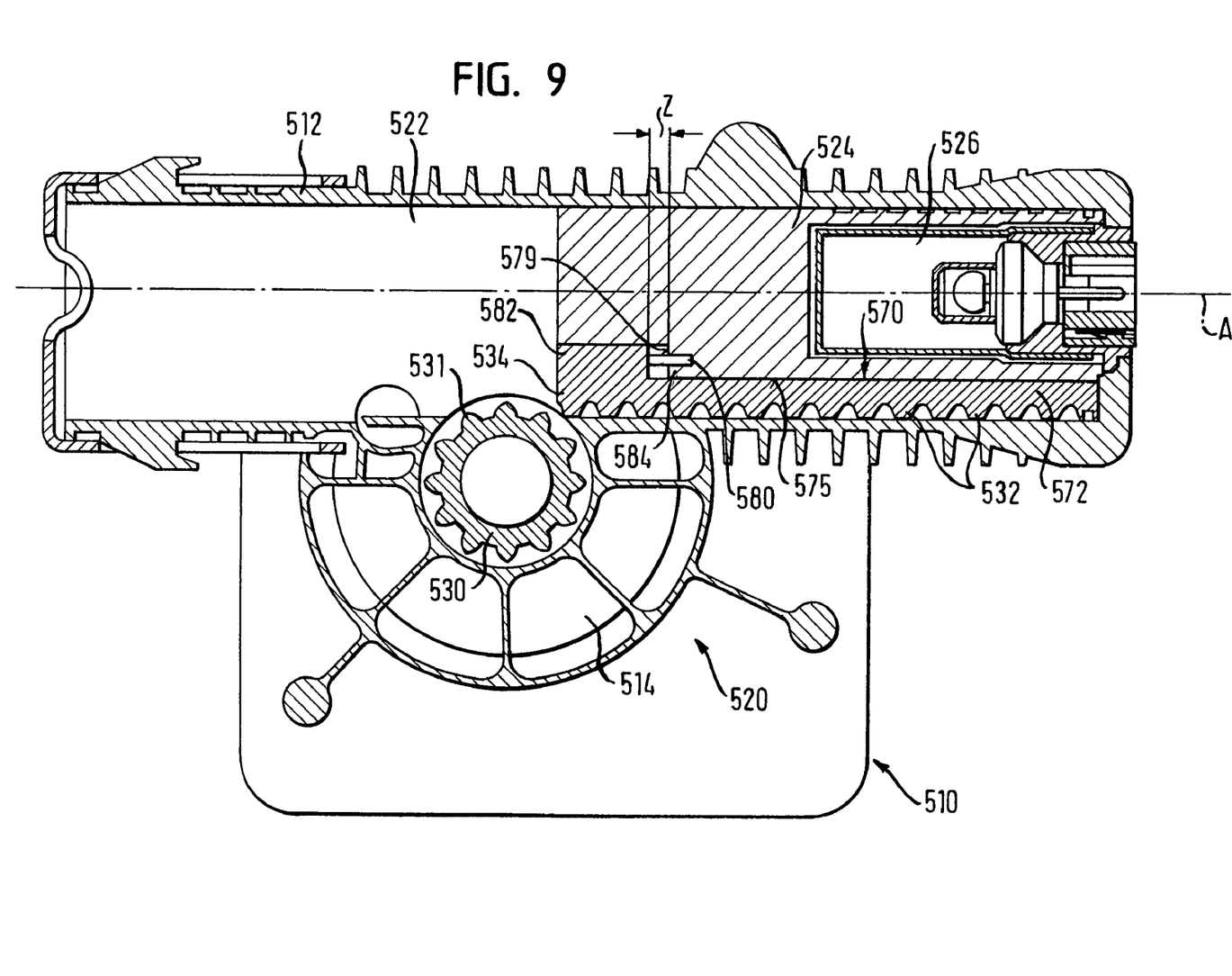
FIG. 9 shows a diagrammatic cross-section through a belt retractor according to a sixth embodiment of the invention.

In a sixth embodiment which is shown in FIG. 9, the entire teeth 532 are constructed on a segment 572 separated from the piston 524, which extends over the entire length of the piston 524 and lies against a sliding surface 575 on the piston 524. The segment 572 has a shoulder 582 on its rear side in the region of the run-in section 534. Accordingly, a gradation 584 with a support surface 579 perpendicular to the sliding surface 575 is constructed in the recess 570 on the piston 524. Between the support surface 579 and the shoulder 582, a gap Z is formed, into which a damping element 580 extends, which sits in a bore in the support surface 579 and fulfils the same function as the damping element 480' described in the previous embodiment.

Figure 11:
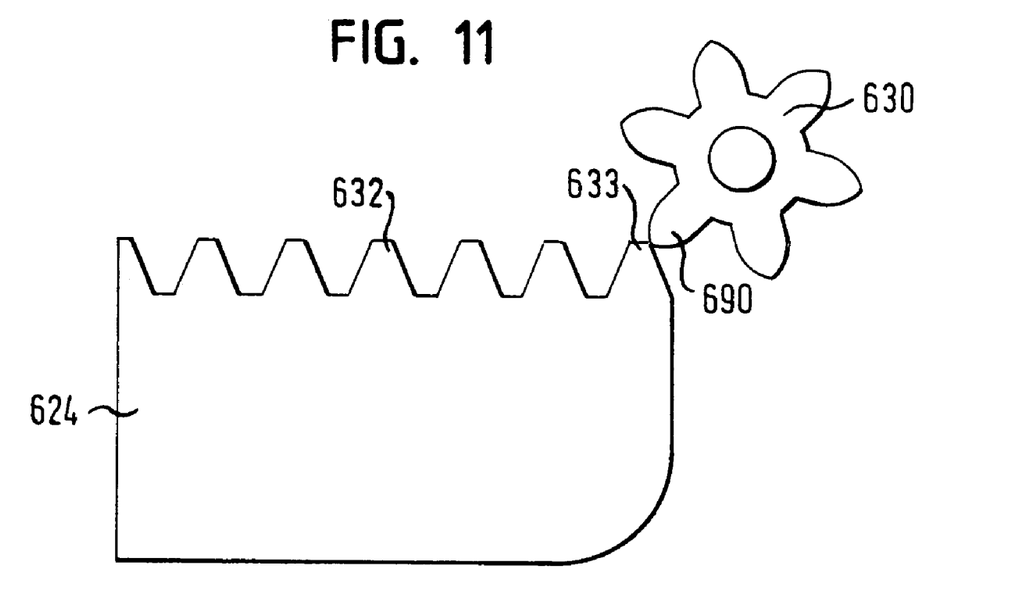
FIG. 11 shows a view of a pinion and of a piston of a linear drive according to a seventh embodiment of the invention in a first state.
Figure 12:
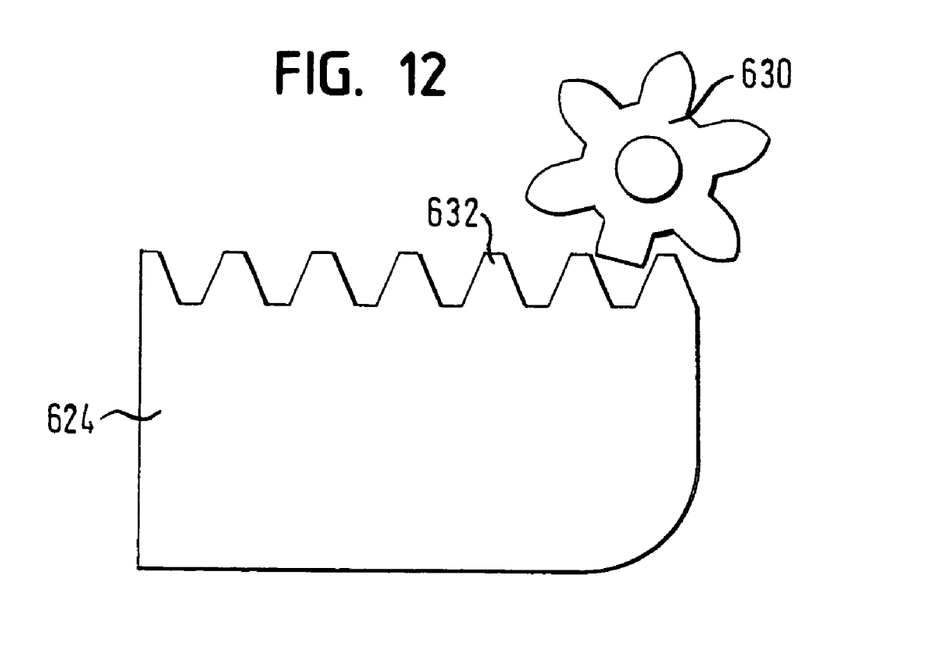
FIG. 12 shows a view of the pinion and of the piston of FIG. 14 in a second state.

In FIGS. 11 and 12 a pinion 630 and the piston 624 for a linear drive can be seen, in accordance with a seventh embodiment of the invention.

Figure 13:
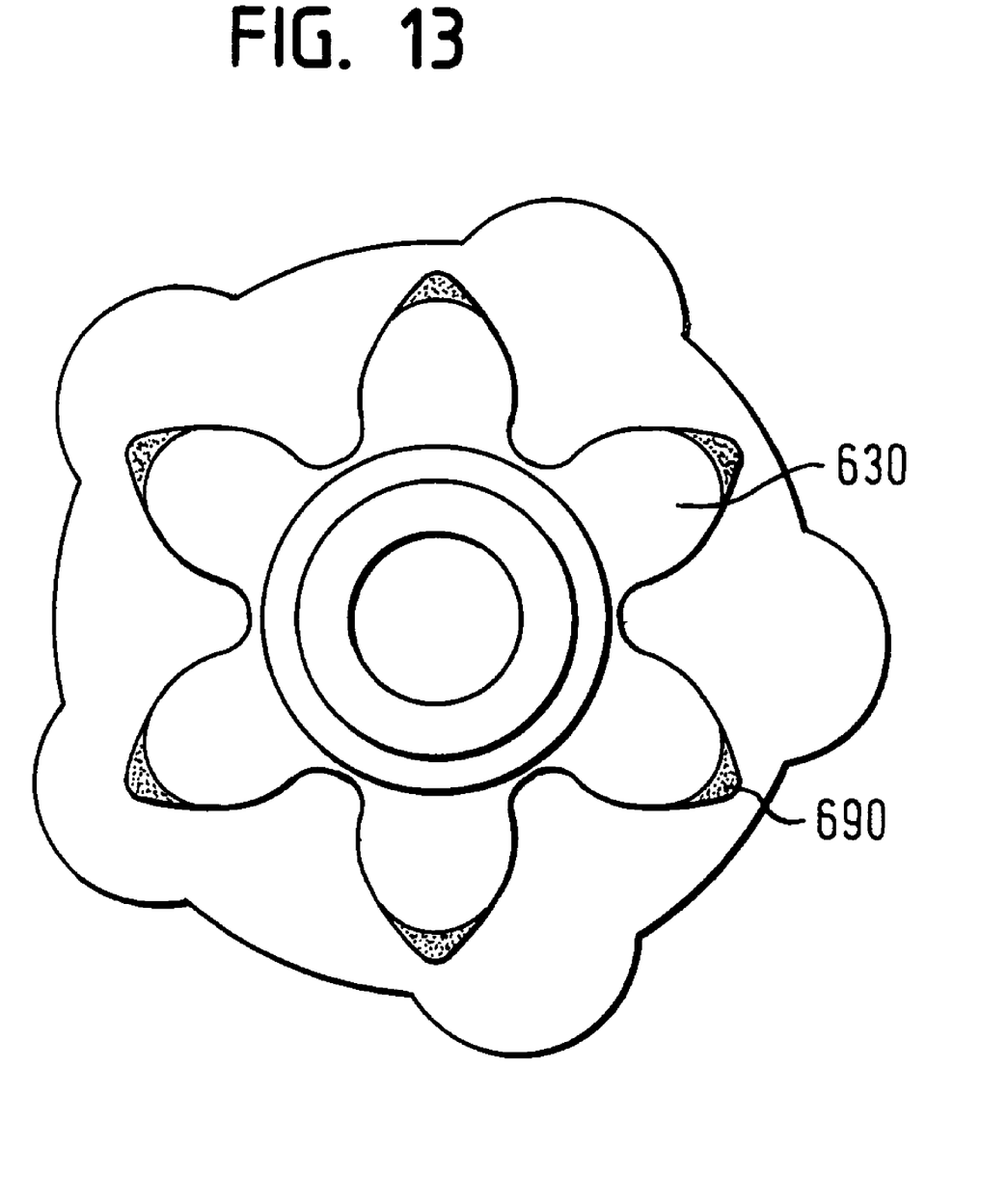
FIG. 13 shows a view of the pinion of FIG. 11.

In this embodiment, the tooth tips 690 on the pinion 630, which is illustrated on an enlarged scale in FIG. 13, are deformable and therefore form deformable elements which prevent the blocking in the running in of the teeth 632. When the first tooth 633 of the teeth 632 strikes onto one of the teeth of the pinion 630 so that that it exerts a contact force which acts radially onto the pinion 330 (FIG. 11), then the tooth tip 690 which is in contact can deform in an elastic and/or plastic manner, so that the tooth of the pinion 630 can engage into the gap behind the first tooth of the teeth 632 (FIG. 12). Thereby, a run-in of the teeth 632, free of blocking, into the pinion 630 is ensured.

The flexibility of the tooth tips 690 is achieved in the illustrated embodiment in that they consist of a different, softer material than the remaining pinion 630. Alternatively, the tooth tips can also consist of the same material as the remaining pinion 630, the flexibility being provided through the design and/or structural formation of the tooth tips 690.

Figure 14:
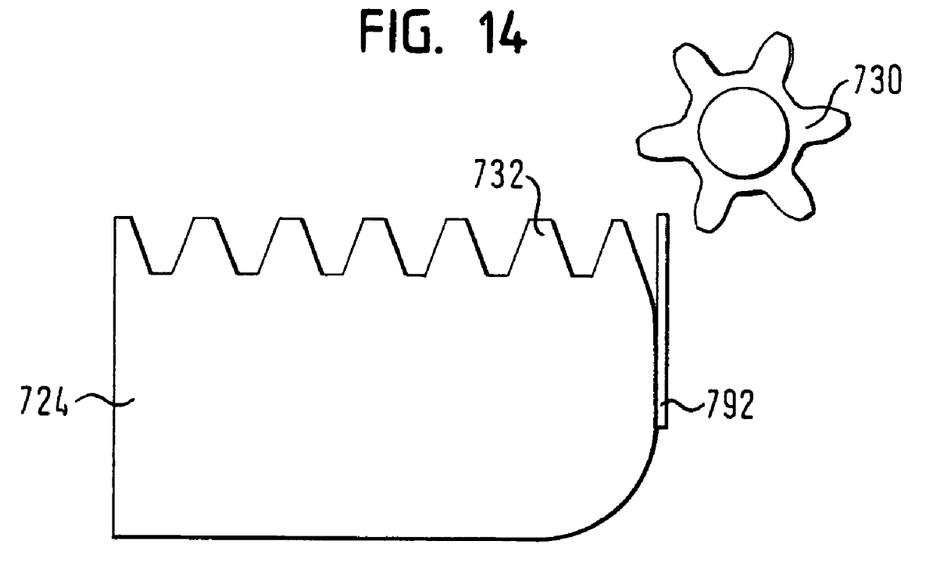
FIG. 14 shows a view of a pinion and of a piston of a linear drive according to an eighth embodiment of the invention in a first state.
Figure 15:
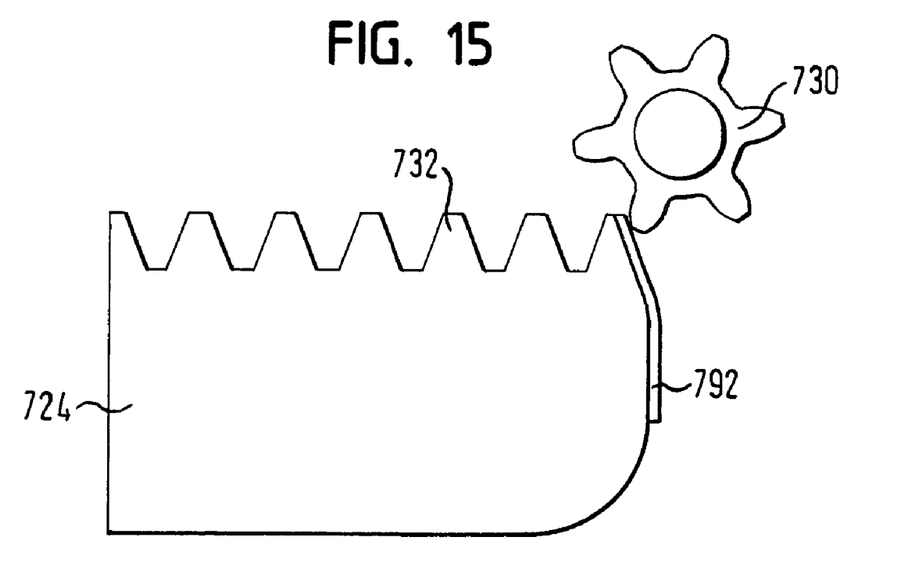
FIG. 15 shows a view of the pinion and of the piston of FIG. 11 in a second state.

In FIGS. 14 and 15 finally, a pinion 730 and the piston 724 can be seen for a linear drive according to an eighth embodiment of the invention.

In this embodiment, the deformable element is realized in the form of a deformable spring element 792, which is placed in front of the teeth 732. With the run-in of the teeth 732 into the pinion 730, the spring element 792 strikes onto a tooth of the pinion 730. Thereby, the pinion 730 is firstly turned further into a position in which a blocking of the piston 724 is no longer possible through the striking of teeth of the set of teeth 732 and of the pinion 730 onto each other. Secondly, in so doing the spring plate is deformed (FIG. 15), whereby energy is decreased and hence the run-in of the teeth 732 into the pinion 730 is damped.

The spring element 732 can be provided for example in the form of a spring plate of metal or a spring tongue of plastic. Advantageously, the first tooth of the set of teeth 732 is constructed with smaller dimensions than the following teeth. Only together with the deformed spring element 792 does it have the same shape and size as the remaining teeth. Thereby, it is ensured that the module of the teeth 732 does not change through the spring element 792.

The invention claimed is:

1. A linear drive having a cylinder, a piston guided displaceably in said cylinder, and a pinion, said piston being provided with teeth which can engage into said pinion in order to rotate said pinion upon displacement of said piston, and having at least one deformable element which prevents blocking when said teeth enter into engagement with said pinion, a driven element is provided, said driven element being driven by said pinion, and said deformable element is provided between said driven element and said pinion, said deformable element allowing said pinion to yield with respect to said driven element.

2. The linear drive according to claim 1, wherein said driven element has a recess with inner teeth into which outer teeth of said pinion engage.

3. The linear drive according to claim 1, wherein said deformable element consists of an elastic body.

4. The linear drive according to claim 1, wherein said piston is produced as a die cast metal part.

5. A belt retractor with a belt tensioner which has a linear drive according to claim 1, wherein said driven element is a belt spool.

6. The belt retractor according to claim 5, wherein said pinion is coupled with said belt spool.

7. The belt retractor according to claim 6, wherein said belt spool has an undulating extension on which said pinion sits.

8. The belt retractor according to claim 5, wherein said pinion has a flange which engages into a recess on said belt spool.

9. The linear drive according to claim 1, wherein a housing is provided in which both said cylinder and also bearing sites are formed in one piece on both sides of said pinion.

10. The linear drive according to claim 1, wherein said housing is produced as a die cast metal part.

11. A linear drive having a cylinder, a piston guided displaceably in said cylinder, and a pinion, said piston being provided with teeth which can engage into said pinion in order to rotate said pinion upon displacement of said piston, and having at least one deformable element which prevents blocking when said teeth enter into engagement with said pinion, a driven element is provided, said driven element being driven by said pinion, and said deformable element is provided between said driven element and said pinion, said deformable element allowing said pinion to yield with respect to said driven element, wherein said pinion has a bore with inner teeth into which outer teeth of said driven element engage.

12. A belt retractor with a belt tensioner which has a linear drive according to claim 11, wherein said driven element is belt spool.

* * * * *